United States Patent [19]

Wendorff

[11] Patent Number: 4,548,418
[45] Date of Patent: Oct. 22, 1985

[54] TRAILER SUPPORT STAND

[76] Inventor: Donn Wendorff, Rte. 1, Mayville, Wis. 53050

[21] Appl. No.: 505,988

[22] Filed: Jun. 20, 1983

[51] Int. Cl.⁴ .............................................. B60S 9/02
[52] U.S. Cl. ..................................... 280/1; 248/352; 280/507; 280/511
[58] Field of Search ............... 70/58; 280/1, 507, 475, 280/511; 248/351, 352; 52/40, 143

[56] References Cited

U.S. PATENT DOCUMENTS

| | | | |
|---|---|---|---|
| 2,802,635 | 8/1957 | Engelbart | 248/352 |
| 3,599,923 | 8/1971 | Hunnicutt | 248/352 |
| 3,797,283 | 3/1974 | Honer | 248/1 |
| 3,970,278 | 7/1976 | Studer | 248/352 |
| 4,042,202 | 8/1977 | Molinari | 248/352 |

Primary Examiner—Richard A. Bertsch
Attorney, Agent, or Firm—Andrus, Sceales, Starke & Sawall

[57] ABSTRACT

A trailer support stand. The stand includes a base having a plurality of peripheral edges. A series of legs extend upwardly from the base and are connected at their upper ends to a generally flat plate. A ball is mounted in spaced relation above the plate and the peripheral edge of the plate extends radially beyond the outer diameter of the ball. A conventional socket coupling member on the trailer tongue is adapted to be engaged with the ball to thereby support the trailer tongue at trailer hitch height. The stand is non-tipping and when the trailer coupling is locked to the ball, the trailer is theft proof.

9 Claims, 3 Drawing Figures

TRAILER SUPPORT STAND

BACKGROUND OF THE INVENTION

Trailers, such as boat trailers and utility trailers used to haul snowmobiles, motor cycles, and other cargo, are normally connected to the vehicle by means of a ball and socket-type coupling. With this type of coupling, a socket attached to the trailer tongue is engaged with the ball mounted at the rear of the vehicle. When the trailer is removed from attachment to the vehicle, it is often desirable to be able to support the trailer tongue at hitch level to eliminate the need for having to lift the tongue from ground level to hitch height when the trailer is reattached to the vehicle and to prevent the coupling from resting on the ground or dirt.

In the past, retractable wheel supports have been used with the trailer tongue to maintain the tongue above ground level. With this type of support, the wheel is lowered into contact with the ground through operation of a rack and pinion mechanism to lift the trailer tongue out of engagement with the ball on the vehicle. The trailer can then be moved to a desired location on the wheel support, and the wheel support will retain the tongue at the desired height. However, retractable wheel supports are relatively expensive and for that reason have not seen substantial use with small trailers.

In other situations concrete blocks, logs and the like have been used to support the trailer tongue when the trailer is disengaged from the vehicle. However, if the trailer is moved either in a front-to-rear or side-to-side direction, supports of this type will normally tip causing the tongue to fall to the ground and possibly damage the coupling mechanism.

Because of this there has been a need for an inexpensive trailer support stand which will not tip and is capable of following limited trailer movement.

SUMMARY OF THE INVENTION

The invention is directed to an inexpensive trailer support stand for supporting the tongue of the trailer when the trailer is detached from a vehicle. In accordance with the invention, the support stand includes a base, preferably triangular in configuration, composed of a plurality of skid bars. Legs extend upwardly from the base and are connected at their upper ends to a generally flat plate. Mounted in spaced relation above the plate is a ball and the peripheral edge of the plate extends radially outward beyond the outer diameter of the ball.

The ball is adapted to be engaged by a conventional socket coupling member on the trailer tongue and the stand will thus support the trailer tongue at trailer hitch height.

The stand will not tip regardless of whether the trailer moves in a front-to-rear direction or with side movement. When the trailer moves, the stand will tilt to a slight angle until the side of the socket coupling member engages the plate. Continued trailer movement will then cause the stand to rotate relative to the trailer tongue, due to the ball and socket connection, so that one of the skid bars will be in contact with the ground and will be positioned perpendicular to the direction of trailer movement. Continued trailer movement will then cause the skid bar to slide or skid over the ground with the result that the stand will not tip and the trailer tongue will be supported above ground at all times.

The trailer stand acts to support the trailer tongue at hitch level, so that no lifting of the tongue is required when the trailer is to be re-attached to a vehicle. Furthermore, by supporting the coupling mechanism above ground there is no possibility of the coupling mechanism being contaminated with mud, dirt or other foreign material.

By locking the trailer coupling mechanism to the ball, the trailer is theft proof. In this regard, the plate, which is located beneath the ball, prevents access to the underside of the coupling mechanism, thereby preventing manual loosening of the socket member, even though locked, and preventing disengagement of the coupling mechanism with the ball.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
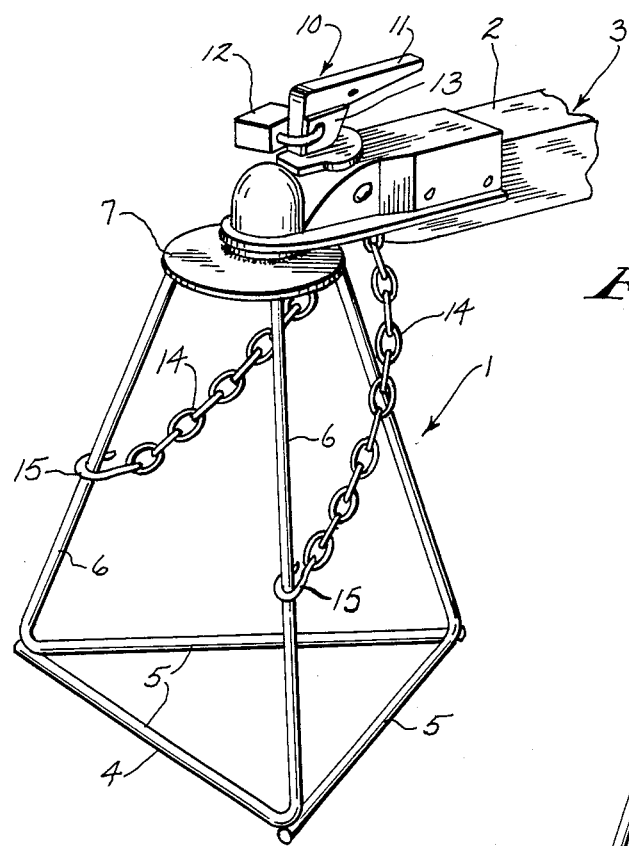
FIG. 1 is a perspective view of the trailer support stand of the invention as supporting the tongue of a trailer.

FIG. 1 shows a trailer support stand 1 of the invention as supporting the tongue 2 of a trailer 3. Trailer 3 can be any type of conventional trailer which is normally connected to a vehicle through a ball and socket type coupling mechanism. More specifically, the trailer can be a boat trailer, or a utility trailer employed to haul snowmobiles, motorcycles, cargo or the like.

The stand 1 includes a polygonal base 4 which in its preferred form is triangular in shape and is composed of three skid bars 5 which are connected at their adjacent ends. Extending upwardly from base 4 are a series of legs 6, the lower ends are secured to the corners of base 4, while the upper ends of legs 6 are welded or otherwise secured to the undersurface of a generally flat plate 7.

Figure 2:
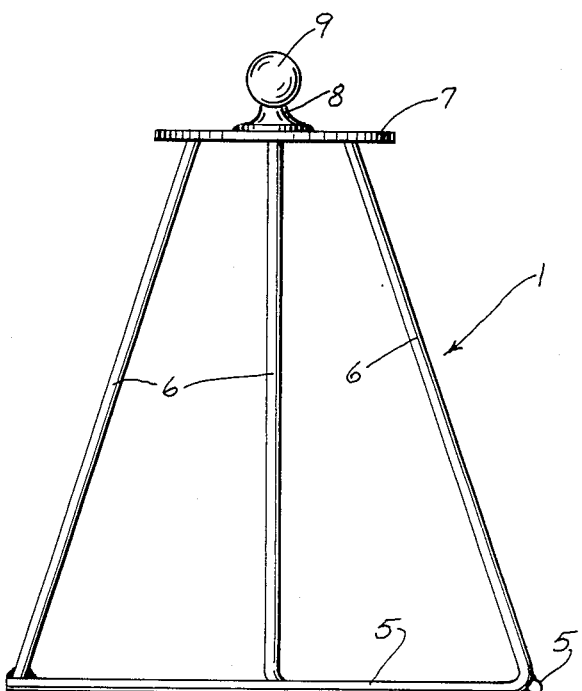
FIG. 2 is a side elevation of the stand with the trailer tongue disengaged.

As shown in FIG. 2, a stem 8 extends upwardly from plate 7 and a ball 9 is mounted on stem 8 in a manner so that the ball 9 is spaced slightly above the upper surface of plate 7.

Ball 9 is adapted to be engaged by a conventional socket coupling mechanism 10 mounted on the end of the trailer tongue 2. The coupling mechanism which is a standard type, includes a socket, not shown, which can be moved to a locking position with ball 9 through operation of the pivotable lever 11, mounted on the coupling mechanism. The socket coupling mechanism 10 can be maintained in the locked condition by a padlock 12 or other locking device which is inserted through aligned openings in the lever 11 and brackets 13. With the lock 12 engaged, the lever 11 cannot be pivoted to its release position, so that the coupling mechanism 10 will be locked to ball 9.

The trailer 3 will normally include a pair of safety chains 14 which are adapted to be attached to the trailer hitch on a vehicle. When the trailer tongue is supported on the stand 1, the clasps 15 on the ends of chains 14 can be attached to the legs 6 which serves as a convenient manner of storing the chains.

Figure 3:
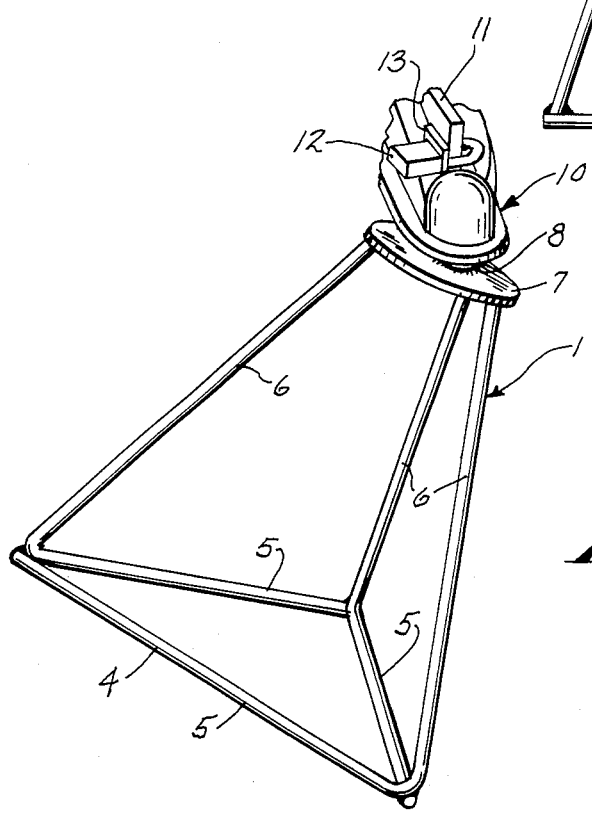
FIG. 3 is a perspective view showing the stand in a tilted condition caused by movement of the trailer.

The stand of the invention will not tip regardless of whether the trailer is moved in a front-to-rear or side-to-side movement. If the trailer is moved while the tongue 2 is supported on stand 1, initial movement will cause the stand to tilt, as shown in FIG. 3, until the side flange of the coupling 10 engages the upper surface of plate 7. Continued trailer movement will then cause the stand to rotate about one of the corners of the base 4 due to the ball and socket connection to thereby move one of the skid bars into full contact with the ground and in a position normal or perpendicular to the direction of movement. With the skid bar so positioned, continued movement of the trailer will cause the stand to skid or slide over the ground to accommodate the trailer movement. Thus, the stand will not tip to drop the trailer tongue in the event the trailer may be moved accidentally. The stand can also be used as a mobile support for short distances of travel for the trailer.

As a further and important feature, the trailer is theft proof when the coupling mechanism is locked to the ball 9 through use of a padlock 12 or other security device. Plate 10 by extending outwardly from the ball 9 prevents access to the underside of the socket coupling mechanism. Thus, the socket coupler cannot be unscrewed from below to release the coupling mechanism.

Thus, the invention provides a simple and inexpensive non-tipping trailer support stand which prevents theft of the trailer.

Various modes of carrying out the invention are contemplated as being within the scope of the following claims particularly pointing out and distinctly claiming the subject matter which is regarded as the invention.

I claim:

1. A trailer support stand, comprising a polygonal base having a plurality of outer edges, a plate spaced above the base, support means interconnecting the base and the plate, a ball mounted above the plate, the peripheral edge of the plate extending a substantial distance radially beyond the outer surface of the ball, and a stem interconnecting said ball and said plate, said stem including an upper end connected to the ball and a lower end connected to said plate, said lower end having a substantially greater cross sectional area than said upper end, a socket coupling member on the tongue of the trailer adapted to lockingly engage the ball to thereby support the trailer tongue above ground, said stand being non-tipping regardless of movement applied to the trailer.

2. The stand of claim 1, wherein said base is composed of a plurality of skid bars connected together at adjacent ends.

3. The stand of claim 2, wherein the base is triangular in shape and is composed of three skid bars.

4. The stand of claim 3, wherein said support means comprises a plurality of legs connected to the corners of said triangular base.

5. The stand of claim 1, wherein said plate is generally flat and said ball is mounted centrally with respect to the upper surface of said plate.

6. The stand of claim 1, wherein said support means comprises a plurality of legs.

7. In combination, a trailer having a tongue, a coupling mechanism mounted on said tongue for coupling the trailer to a vehicle and including socket means, and a trailer support stand for supporting the trailer tongue when the trailer is not attached to a vehicle, said trailer support stand including a polygonal base having a plurality of generally straight outer edges, a plate spaced above said base, support means interconnecting the base and the plate, said socket means disposed to engage the ball to support the trailer tongue, the plate extending a substantial distance radially beyond said socket means, said plate and said ball being arranged so that limited tilting movement of said stand will cause the peripheral edge of said socket means to engage said plate to limit said pivotal movement, said stand being non-tipping under all conditions of movement of the trailer.

8. In combination, a trailer having a tongue, a coupling mechanism mounted on said tongue for coupling the trailer to a vehicle and including socket means, and a trailer support stand for supporting the trailer tongue when the trailer is not attached to a vehicle, said trailer support stand including a base composed of a plurality of generally straight skid bars connected together at corners, a ball disposed above said base, support means interconnecting the base and the ball, said socket means disposed to engage said ball to support the trailer tongue above ground, a generally horizontal force applied through said tongue to said ball causing said stand to tilt relative to the ground, and a tilt restricting member located at the upper end of said support means beneath said ball, said tilt restricting member extending a substantial distance laterally beyond the outer periphery of said ball and being disposed to be contacted by a side edge of said tongue when said horizontal force is applied to said tongue to thereby limit tiliting movement of said stand.

9. The combination of claim 8, wherein said base is generally triangular in shape and includes three skid bars.

* * * * *